United States Patent [19]

McCullough, Jr. et al.

[11] Patent Number: 4,999,385

[45] Date of Patent: Mar. 12, 1991

[54] CARBONACEOUS FOAMS

[75] Inventors: Francis P. McCullough, Jr., Lake Jackson, Tex.; David M. Hall, Auburn, Ala.; William G. Stobby, Johntown; Kyung W. Suh, Granville, both of Ohio

[73] Assignee: The Dow Chemical Company, Midland, Mich.

[21] Appl. No.: 475,592

[22] Filed: Feb. 6, 1990

Related U.S. Application Data

[60] Continuation-in-part of Ser. No. 379,520, Jul. 13, 1989, abandoned, which is a division of Ser. No. 285,141, Dec. 16, 1988, abandoned.

[51] Int. Cl.$^5$ .................... C08F 36/00; B01J 20/26
[52] U.S. Cl. ................... 521/149; 502/402; 502/418; 502/29; 521/142; 521/918; 423/445; 423/449; 252/502

[58] Field of Search ............ 521/142, 149, 918; 502/402, 418, 445, 449; 423/445, 449

[56] References Cited

U.S. PATENT DOCUMENTS

| | | | |
|---|---|---|---|
| 3,960,770 | 6/1976 | Raley, Jr. et al. | 423/445 |
| 4,489,913 | 12/1984 | Gurgiolo et al. | 521/53 |
| 4,507,272 | 3/1985 | Mullen et al. | 423/449 |
| 4,698,369 | 10/1987 | Bell | 521/99 |
| 4,775,655 | 10/1988 | Edwards et al. | 423/445 |
| 4,832,881 | 5/1989 | Arnold, Jr. et al. | 264/29.7 |
| 4,837,076 | 6/1989 | McCullough, Jr. et al. | 264/DIG. 40 |

*Primary Examiner*—Morton Foelak

[57] ABSTRACT

A flame-retardant polymeric foam which comprises a carbonaceous irreversibly heat set, cellular polymer derived from a stabilized polyacrylonitrile based foam.

14 Claims, No Drawings

CARBONACEOUS FOAMS

This is a continuation-in-part of application Ser. No. 379,520, filed July 13, 1989, which in turn is a divisional of U.S. Ser. No. 285,141, filed Dec. 16, 1988 of McCullough et al entitled, "Carbonaceous Foams".

FIELD OF THE INVENTION

This invention relates to a method for the production of novel stabilized or oxidized polyacrylonitrile based foams and flame-retardant carbonaceous foams obtained therefrom. More particularly, the invention provides a non-flammable non-graphitic carbonaceous polyacrylonitrile foam structures having low heat conductivity and excellent thermal insulation properties and to their precursor foams. In addition, there are prepared foams of different electroconductivity.

BACKGROUND OF THE INVENTION

The physical and mechanical properties of foams make them useful for a wide variety of applications, including insulation, upholstery and bedding. However, many foams, for example polyurethane, are inherently flammable and lead to melting and spread of burning debris. In the case of many "conventional" foams such characteristics lead to the sustaining of combustion by progressive smoldering even after the actual flames have extinguished.

It is considered that cellular materials manufactured from flammable polymers are more flammable than the solid materials because the insulating effect of their cellular nature allows a rapid build-up of heat at the heating surface with a consequence high rate of pyrolysis. In solid materials this heat build-up is at a lower rate because of the higher conductivity of the solid material. Although rigid foams have similar thermal conductivity behavior to flexible foams, the high cross-linked nature of their chemical structure makes them less flammable as polymers and also inherently more inclined to form a protective char rather than to form the flaming molten polymer droplets which occur with flexible foams. While both solid and rigid cellular materials burn less easily than flexible foams and are easier to extinguish, they tend to smolder and emit toxic fumes.

Various methods are known to reduce the flammability of polymer foams. Commonly, additives such as aluminum trihydrate or phosphorus-containing compounds are incorporated into the foam for this purpose. Alternatively, halogenated polyols, especially brominated polyols such as dibromoneopentyl glycol, or mod acrylics are used in connection with polyurethanes to increase the flame resistance of the foam. None of these additives have proved entirely satisfactory.

It is known that the incorporation of trimerized polyisocyanates (i.e. isocyanaurates) into a polyurethane foam improves its burn characteristics. For example, trimerized toluenediisocyanate has been used to prepare flexible foams. Although these foams do exhibit good foam characteristics, they also have poor physical properties, particularly poor compression sets and partial cell collapse In addition, trimerized toluene diisocyanate tends to precipitate from the isocyanate solution in which it is dissolved, causing storage problems and a lack of uniformity in foams prepared therewith.

Polyurethane foams have heretofore been rendered electroconductive by impregnating the foam with an aqueous dispersion of conductive carbon black containing a binder, by impregnating the foam with a styrene butadiene binder containing conductive carbon, by wetting polyurethane foam particles with binders and conductive carbon black and then molding to a desired configuration or by adding conductive carbon black to the polyurethane prepolymer and then foaming.

U.S. Pat. No. 4,698,369 to Bell discloses flexible, flame-retardant polyurethane foams containing up to 30% graphite.

U.S. Pat. No. 4,489,913 to Gurgiolo et al, which is herein incorporated by reference, relates to electroconductive foams prepared by dehydrohalogenating a foam containing a halogen-containing polymer including chlorinated polyacrylonitrile.

U.S. Pat. No. 4,832,881 to Arnold, Jr. et al discloses the preparation of low density microcellular carbon foams. However, the foams are rigid and brittle and possess a specific resistivity of less than $10^1$ ohm-cm.

U.S. Pat. No. 4,837,076 to McCullough, Jr. et al, which is herein incorporated by reference, relates to the preparation of non-linear carbonaceous fibers and to carbonaceous fibers having different electroconductivity.

The term "stabilized" herein applies to precursor foams which have been oxidized at specific temperature, typically about 150–525° C., preferably less than about 250° C. as described in said U.S. Pat. No. 4,837,076. It will be understood that in some instances the foams are oxidized by chemical oxidants at lower temperatures.

The term "material density" as used herein refers to the density of the material as measured on a standard density gradient column according to the procedure described by David M. Hall in "Practical Fiber Identification", Dept. of Textile Engineering, Auburn Un., 2d Ed., 1982, p. 51–54.

The carbonaceous fibers have an LOI value greater than 40 as tested according to ASTM D2863-77. The test method is also known as "Oxygen Index" or "Limited Oxygen Index" (LOI). With this procedure, the concentration of oxygen in $O_2/N_2$ mixtures is determined at which a vertically mounted specimen is ignited at its upper end and just (barely) continues to burn. The width of the specimen is from 0.65 to 0.3 cm with a length of from 7 to 15 cm. The LOI value is calculated according to the equation:

$$LOI = \frac{[O_2]}{[O_2] + [N_2]} \times 100$$

The term "carbonaceous foams" as used herein relates to polymeric foams whose carbon content has been irreversibly increased as a result of a chemical reaction such as a heat treatment, as disclosed in U.S. Pat. No. 4,837,076.

The term "non-graphitic" as used herein relates to those carbonaceous materials having an elemental carbon content of less than 92 percent (%), which are substantially free of oriented carbon or graphite microcrystals of a three dimensional order, and as further defined in U.S. Pat. No. 4,005,183, which is herein incorporated by reference.

SUMMARY OF THE INVENTION

In accordance with the present invention there is provided a flame retardant polymeric foam which comprises a non-graphitic carbonaceous irreversibly heat set cellular polymer derived from a novel stabilized polyacrylonitrile based polymer having a material density of less than 1.39 g/cc. The foams of the invention have an LOI value greater than 40. Preferably, the foams have a nitrogen content of about 5 to 35%.

The foams of the present invention can be flexible, rigid, semi-rigid or semiflexible, open cell or closed cell.

The foams of the present invention can be obtained by the steps of (a) preparing a foamed product of polyacrylonitrile based material; (b) stabilizing or oxidizing the foamed product so as to have a material density not greater than 1.39 g/cc and then (c) heat treating the stabilized foam in an inert atmosphere at a temperature to provide a desired electroconductivity and to form an irreversibly set cellular material.

The carbonaceous foams of the invention can also be characterized by having a thermal conductivity of less than 1 BTU ft/Hr ft$^2$ °F.

The thermal conductivities of different materials are as follows:

|  | % Char | Conductivity ft/Hr/ft$^2$ °F. |
| --- | --- | --- |
| Carbonaceous particles (18.6% N$_2$) of invention | >65 | 0.1 |
| Carbonaceous particles (16.0 N$_2$) of invention | >65 | 0.2 |
| KEVLAR | 60 | <1 |
| KODEL 410 polyester | 10 | <1 |
| Polyacrylonitrile | 60 | <1 |
| Oxidized polyacrylonitrile | 60 | <1 |
| THORNEL 300* carbon fiber | >95 | 4.84 |
| Cotton | >30 | <1 |
| Rayon | <50 | <1 |
| Polycarbonate | 22 |  |
| Polyethylene terephthalate | 10 | <1 |
| Carbon particles | >90 | 2.5 |
| THORNEL Graphite fiber P758** | >95 | 106.48 |

*1K/3K/6K/15K Carbon yarn of Amoco Corp., Danbury CT.
**2K/4K Carbon yarn derived from pitch of Amoco Corp., Danbury CT.

It is understood that the term "fire resistant" as used herein relates to any one of the characteristics of flame arresting, flame retarding, fire shielding and fire barrier.

An article is considered to be flame retarding to the extent that once an igniting flame has ceased to contact unburned parts of the textile structure, the article has the inherent ability to resist further propagation of the flame along its unburned portion, thereby stopping the internal burning process. Recognized tests to determine whether a textile article is flame retarding are, inter alia, the American Association of Textile Chemists and Colorists Test Method 34-1966 and the National Bureau of Standards Test described in DOC FF 3-71.

An article is considered to be "fire shielding" if it is capable of deflecting flames and the radiation therefrom in a similar manner as aluminum coated protective garments, which are known in the art.

Fire barriers have the capability of being non-flammable, flame retarding and providing thermal insulation characteristics.

The precursor foams of the invention can be prepared by conventional means such as extrusion, impregnation, autoclave, solution expansion or lost foam casting technique.

The blowing agent for preparing the precursor foam materials used in this invention includes those blowing agents which vaporize or otherwise generate a gas under the conditions encountered in the foaming encountered in the foaming reaction Materials which boil under such conditions include low boiling halogenated hydrocarbons such as chlorotrifluoromethane, dichlorodifluoromethane, trichlorofluoromethane, HCFC-141B(CH$_3$CCl$_2$F), HCFC-142B(CH$_3$CClF$_2$), HCFC-123(CF$_3$CHCl$_2$), HCFC-124(CF$_3$CHClF), HFC-134A,(CF$_3$CH$_2$F), methylene chloride, chloroform, trichloroethane and the like. Suitable materials which react to form a gas under such conditions include water and the so-called azo-blowing agents. Materials which dehydrate to release gaseous water under such conditions, including for example, magnesium sulfate heptahydrate, sodium carbonate decahydrate, sodium phosphate dodecahydrate, calcium nitrate tetrahydrate, ammonium carbonate tetrahydrate, and the like. High surface area particulate solids are also useful blowing agents, as described in U.S. Pat. No. 3,753,933. Preferred are CO$_2$, N$_2$, water, halogenated hydrocarbons and mixtures thereof.

A sufficient amount of the blowing agent is used to provide a cellular structure to the polymer. Preferably, sufficient blowing agent is used to provide the polymer with a density from about 0.25 to about 12, more preferably about 0.4-1.0 pounds per cubic foot.

A prepared foam is first stabilized or oxidized by placing the foam in a preheated furnace at a temperature between 150° C. and 525° C., preferably less than 250° C. as described in U.S. Pat. No. 4,837,076, under conditions so that the material density of the stabilized foam is less than 1.39 g/cc.

The stabilized foam is then heat treated in an inert atmosphere at a temperature ranging between 175° C. to about 1500° C. for a period of time whereby an irreversible set chemical change occurs and the final electrical characteristics desired in the foam is achieved.

A first group of carbonaceous foams that is thus produced can be classified as being electrically nonconductive and possessing no antistatic characteristics, i.e. they do not have the ability to dissipate an electrostatic charge. These foams when prepared from stabilized polyacrylonitrile have a carbon content of greater than 65 percent (%) but less than 85%.

When the precursor foam is a polyacrylonitrile foam it has been found that a nitrogen content of about 20% or more results in a nonelectrically conductive foam. That is, the foams have a specific resistivity of greater than $10^3$ ohm-cm, typically greater than $10^7$ ohm-cm.

In a second group, the carbonaceous foams are classified as having low conductivity, having static dissipating characteristics. These foams typically have a specific resistance of about $10^3$ to $10^1$ ohm-cm and a carbon content of less than 85 percent. Preferably, the carbonaceous foams are derived from stabilized polyacrylonitrile based foams and possess a percentage nitrogen content of from about 16 to 20 percent.

In a third group are foams having a carbon content of at least 85 percent. These foams are characterized as being highly electrically conductive. That is, the specific resistance is less than $10^1$ ohm cm and the foams are useful in applications where electrical grounding or shielding are also desired. The third group of foams are preferably obtained by heat treating at a temperature above about 750° C. for a period of time to increase the carbon content and to avoid full carbonization.

However, the preferred carbonaceous foams of the invention have a specific resistance greater than $10^1$ ohm-cm.

It is understood that the time period of heat treatment is also a factor to be considered. The time period is determined upon such factors as size of foam, the specific polymer, etc.

The precursor acrylic materials which are advantageously utilized in preparing the foams of the invention are selected from the group consisting of acrylonitrile homopolymers, acrylonitrile copolymers and acrylonitrile terpolymers. The copolymers preferably contain at least about 85 mole percent of acrylonitrile units and up to 15 mole percent of one or more comonomers such as methylacrylate, methyl methacrylate, vinyl chloride, vinylidene chloride, vinyl pyridine, fumeric acid, itaconic acid, and the like, copolymerized therewith. Also, the acrylic materials may comprise terpolymers, preferably, wherein the acrylonitrile units are at least 85 mole percent. Preferably, there is retained a nitrogen content of at least about 5%.

In accordance with another embodiment of the invention, there is provided an effective fire barrier which comprises the carbonaceous foams of the invention in combination with an organosilicone polymer which is characterized by the following recurring units:

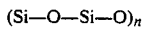

$(Si-O-Si-O)_n$

The organosilicone polymer is present in the structure preferably on a surface which can contact a flame in an amount sufficient to impart ignition resistance, as defined by 14 CFR 25.853(b), to the structure.

The organosilicone polymers utilized in the invention are the known organosilicone polymers which are prepared from precursor silicone resins by a hydrolysis, heat condensation, or free radical condensation reaction Preferred organosilicone polymers are those which can be prepared by setting or curing a compound selected from the group consisting of the hydrolyzed partial condensation product of $R_xSi(OR')_{4-x}$ and $R_xSi(OOR')_{4-x}$, wherein R is an organic radical and R' is a lower alkyl or phenyl radical, and x is at least 1 and less than 4. The amount of organosilicone polymer ignition resistance. Generally, 0.5 to 50% by weight of the organosilicone polymer is used depending whether it is used on the surface and/or within the foam structure.

Preferably, R is selected from the group consisting of lower alkyl, alkenyl, substituted alkyl and aryl. The preferred aryl is phenyl.

These organosilicone polymers may be obtained by thermosetting or curing a silicone resin by means of a catalyst. Other suitable silicone resins are mentioned in the Dow Corning Corp. brochure entitled "Information about High Technology Materials", 1986. Preferred silicone resins are the hydrolyzed partial condensation products of trimethoxymethylsilane, methoxytrimethylsilane, dimethoxy dimethyl silane, and the like.

The organosilicone polymers are preferably utilized in amounts of up to about 50% by weight of the carbonaceous material or higher. However, amounts of organosilicone polymer between about 0.5 to 20% have resulted in desirable results in enhancing the ignition resistance, fire resistance and resistance to oxidation of most carbonaceous materials and/or protection of the materials, while maintaining the favorable characteristics of the materials.

Exemplary of the present invention are set forth in the following examples:

EXAMPLE 1

In the following example, a plurality of precursor foams are prepared under varying conditions, using the extrusion impregnation method. In each case, the polymer is heat plastified in an extruder substantially in the manner of U.S. Pat. Nos. 2,669,751 and 3,770,668, which are herein incorporated by reference, and a volatile fluid blowing agent is injected into the heat plastified polymer stream. From the extruder the heat plastified gel is passed into a mixer, the mixer being a rotary mixer wherein a studded rotor is enclosed within a housing which has a studded internal surface which intermeshes with the studs on the rotor. The heat plastified gel from the extruder is fed into the end of the mixer and discharged from the remaining end, the flow being in a generally axial direction. From the mixer, the gel passes through coolers such as are described in U.S. Pat. No. 2,669,751 and from the coolers to a die which extrudes a generally rectangular board.

A. A heat plastified polyacrylonitrile stream is fed to the extruder at the rate of 541 parts by weight per hour. The blowing agent consists of a 1:1 by weight mixture of methyl chloride and dichlorodifluoromethane which is injected into the heat plastified polymer prior to its entry to the mixer. The intermeshing studs of the mixer have a relative velocity of 100 feet per minute. A total feed of $20.3 \times 10^{-4}$ moles of blowing agent per gram of polymer is employed. 0.06 part of indigo per 100 parts of polymer is added as a nucleator. A stable rectangular board is extruded at a temperature of 121.5.° C. having a cross-sectional dimension of $2.25 \times 24$ inches and an average cell diameter of 0.4 millimeter.

B. The foam from Part A was stabilized by heating in an oven at 175° C. for 20 minutes.

EXAMPLE 2

Precursor foam material is prepared according to the autoclave method as follows:

In an autoclave having an inner volume of 5 liters, 2 kg of acrylonitrile resin pellets and 1 kg of trichloromonofluoromethane were heated at 45° C. Consequently, there were obtained foamable resin pellets containing 0.19 and 0.15 g mol/(100 g of resin) of the foaming agent. When the pellets were foamed by heating with steam of 0.3 kg/cm$^2$ in gauge pressure to test for maximum expansion ratio. The results were 350-fold and 215-fold (both after 80 seconds' heating with steam). The data indicate that even when the inclusion of the foaming agent in the acrylonitrile resin was effected by the autoclave method instead of the extrusion impregnation method, the pellets were foamed at as high expansion ratios. The thus obtained foam is stabilized according to the process of Example 1.

EXAMPLE 3

A series of runs were made to determine the effect various heat treatment temperatures had on the foams. A significant property was the specific resistivity of the foams. To determine such property numerous samples of oxidation stabilized polyacrylonitrile foams of Examples 1 and 2 were utilized. The foams were placed on an oxygen free nitrogen pad in an incremental quartz-tube furnace. The temperature of the furnace was gradually increased from room temperature to about 550 degrees C over a three hour period with the higher temperatures being achieved by 50 degrees C increments every 10–15 minutes. The material was held at the desired temperature for about 1 hour, the furnace opened and allowed to cool while purging with argon.

The specific resistivity of the foams was calculated from measurements made on selected samples. The results are set forth in the following table:

| Final Temp. in Degrees C. | Specific Resistivity measured in ohm-cm |
| --- | --- |
| 525 | $10^8$ |
| 550 | $10^7$ |
| 650 | $10^6$ |
| 850 | $10^1$ |

EXAMPLE 4

Nonflammability Test

The nonflammability of the foam of the invention has been determined following the test procedure set forth in 14 FAR 25.853(b), which is herewith incorporated by reference. Each sample of Example 3 passed this test. Each sample also had an LOI value greater than 40.

EXAMPLE 5

Special acrylic fiber manufactured by Courtaulds (U.K.) was dissolved in 10 to 15% sodium thiocyanate solution in an amount of 15% by weight. The resulting mixture was placed in a beaker and sufficient polymethylmethacrylate beads were added so that the final volume occupied by the beads of the resulting mixture was approximately 65% beads and 35% solution containing the dissolved or solvated SAF (special acrylic fiber). The resulting mixture was stirred and poured into a small mold. The water from the resulting mixture was allowed to evaporate in an oven at 60° C. until a solid material was formed in the mold. This material was then carefully extracted with distilled deionized water to remove most of the sodium thiocyanate which had incorporated into the solid. The extracted solid was then allowed to dry at about 60° C. in an oven and then allowed to rise in a temperature of 225° C. for a thirty minute or longer period in order to stabilize the acrylic polymer by oxidation and to drive off the beads in the form of methylmethacrylate to produce an open cell structure. Most of the beads were driven off in the period of thirty minutes to eight hours at a temperature of from 225 to 280° C. The porous solid foam material in its stabilized form was placed in a nitrogen purged oven and heated according to Example 3 up to a final temperature of 550° C. The resulting carbonaceous foam had a density of about 1 to 1 1/2 pounds per cubic foot, a noticeable compressive resiliency and an electrical specific resistance of 1.2 X 10; ohm-cm.

EXAMPLE 6

Following the procedure as outlined in Example 5, the SAF fiber was dissolved in DMF solvent in place of the aqueous sodium thiocyanate solvent. The same amount of polymethylmethacrylate beads was added to the resulting mixture and the mixture containing the additional beads was placed in a mold and the solvent allowed to evaporate. The distilled water extraction step was omitted and the oxidated stabilization and heat treatment was formed in a manner similar to that described in Example 5. The resulting foam had a more homogeneous appearance and was noticeably more resilient and less brittle. The resulting foam had a similar degree of electrical conductivity with a slightly lower density than that measured for Example 5.

EXAMPLE 7

Following the procedure of Example 5 a foam was prepared except that expanded polymethylmethacrylate beads were substituted for standard polymethylmethacrylate beads giving a resulting foam with a density of less than 1 pound per cubic foot.

EXAMPLE 8

Following the procedure of Example 6, a foam was prepared except that expanded polymethylmethacrylate beads were substituted for the standard polymethylmethacrylate beads. The resulting foam had a density of less than 1 pound per cubic foot.

EXAMPLE 9

Acrylic fiber in Example 5 was dissolved in a 90/10 solvent blend of dimethylformamide and 2-pyrrolidinone at a 15 wt % level. A decomposable blowing agent, azodicarbonamide at 15PPH was suspended in the solution and then casted into a polyethylene tray. The solvent was allowed to evaporate off and the resulting film was vacuum-dried at 50° C. for 18 hours. The dried formula was pliable and when heated in a vented oven at 280° C., produced a cellular structure having a density of 3 lbs/cu ft.

EXAMPLE 10

Acrylic fiber was dissolved in a 90/10 solvent blend of dimethylformamide and 2-pyrrolidinone at a 15 wt % level. A decomposable blowing agent, azodicarbonamide at 15PPH was suspended in the solution and then casted into a polyethylene tray. The solvent was allowed to evaporate off and the resulting product was vacuum-dried at 50° C. for 18 hours. The dried product was pliable and when heated in a vented oven at 280° C., produced a cellular structure having a material density less than 1.39 g/cc. The cellular structure was then heat treated according to the procedure disclosed in U.S. Pat. No. 4,837,076 for fibers.

The carbonaceous foam when sprayed with Dow Corning 1-2577 conformal coating (a hydrolyzed partial condensation of trimethoxy methyl silane) until 10% by weight of the foam comprised the coating, produced a foam having improved fire resistance.

The coated carbonaceous foam could be utilized as a fire barrier.

EXAMPLE 11

A. Following the procedure of Example 2 of U.S. Pat. No. 4,832,881, a foam is prepared with 4.67 g of polyacrylonitrile (PAN) in 91 ml. of N,N-dimethyl formamide (DMF). 26 ml. of ethylene glycol heated to 150° C. was slowly added to the PAN solution. The mixture was poured into a warm rectangular mold, cooled to room temperature and allowed to set overnight. The solvent was removed by heating to 50° C. under vacuum.

The resulting foam was then heated in an oven in air at a 220° C. for 18 hours. The resulting oxidized foam had a material density of 1.48g/cc.

B. The oxidized foam from Part A was carbonized in an argon atmosphere at 1000 for 8 hours at a ramp of 5° C./min. The carbonized foam had a specific resistivity of less than $10^{-1}$ ohm-cm.

C. Following the procedure of Part A a foam is prepared. However, the foam was oxidized at 220° C. for 3 hours. The oxidized foam had a material density of 1.38 g/cc.

D. Following the procedure of Part B, the oxidized foam of Part C was carbonized. Carbonization took place at 525° C. for a period of 30 minutes. The resulting foam had a specific resistivity of greater than $10^8$ ohm-cm.

What is claimed is:

1. A non-flammable foam from an acrylonitrile based polymer containing at least 85% acrylonitrile structure which comprises a non-graphitic carbonaceous foam having a nitrogen content of at least 5%, a specific resistivity greater than $10^1$ ohm-cm, and an LOI value greater than 40.

2. The structure of claim 1, wherein said structure has thermal conductivity less than 1 BTU ft/Hr/ft² °F.

3. The structure of claim 1, wherein said foam has a specific resistivity of $10^3$ to $10^1$ ohm-cm.

4. The structure of claim 1, wherein said carbonaceous foam is electrically conductive.

5. The structure of claim 1, wherein said carbonaceous foam is electrically nonconductive and does not possess any electrostatic dissipating characteristics.

6. The foam of claim 1, wherein said foam possesses static dissipating characteristics.

7. A fire barrier comprising the combination of a non-graphitic carbonaceous foam from an acrylonitrile based polymer containing at least 85% acrylonitrile having a nitrogen content of at least 5%, an LOI value of greater than 40, a specific resistivity of greater than $10^{-1}$ ohm-cm with an organosilicone polymer, said organosilicone polymer comprising the following recurring units: $(Si-O-Si-O)_n$, in an amount to provide ignition resistance to said structure.

8. A fire barrier structure of claim 7 wherein, said organosilicone polymer is derived from the hydrolyzed partial condensation product of a compound selected from the group consisting of $R_xSi(OR')_{4-x}$ and $R_x Si(OOR')_{4-x}$, wherein R is an organic radical, R' is a lower alkyl or phenyl radical, and x is at least 1 and less than 4, said organosilicone polymer being present in an amount to provide ignition resistance to said structure.

9. The structure of claim 8 wherein R is selected from the group consisting of lower alkyl, alkenyl, substituted alkyl and aryl.

10. The structure of claim 8 wherein R and R' are lower alkyl.

11. A flame-retardant polymeric foam of claim 1 having a material density less than 1.39 g/cc.

12. The foam of claim 11, wherein said foam has a nitrogen content of about 5 to 35%.

13. The foam of claim 11 which is open celled.

14. The foam of claim 11 which is closed cell.

* * * * *